Patented Dec. 16, 1941

2,266,520

UNITED STATES PATENT OFFICE 2,266,520

DEHYDROGENATION OF HYDROCARBONS

Carlisle M. Thacker, Toledo, Ohio, assignor to The Pure Oil Company, Chicago, Ill., a corporation of Ohio No Drawing. Application June 27, 1938,
Serial No. 216,062

6 Claims. (Cl. 260—683)

This application is a continuation-in-part of application Ser. No. 180,531, filed December 18, 1937, entitled Dehydrogenation of hydrocarbons.

This invention relates to dehydrogenation of low boiling hydrocarbons and is more particularly concerned with catalysts and method for converting paraffinic hydrocarbon gases into unsaturated hydrocarbons of the olefinic type.

The prior art and literature disclose a number of catalysts which have been tried and found useful in dehydrogenation of hydrocarbons. Known catalysts are not entirely satisfactory either because the amount of conversion produced thereby is not sufficiently high to warrant commercial use; or the efficiency of the catalysts is so low that side reactions occur resulting in the formation of undesirable products, such as coke, in large quantities in addition to the desirable unsaturated hydrocarbons; or the life of the catalyst is too short.

I have discovered that dehydrogenation of low boiling saturated hydrocarbon gases can be effected with a high percentage and high efficiency of conversion by using a catalyst containing a difficultly reducible metallic oxide gel, such as activated alumina, which possesses extended surfaces and a highly adsorptive capacity for gas and a vanadium compound, which in combination with the gel imparts thereto the selective property of dehydrogenating hydrocarbons. When a catalyst containing components of these two classes is used, the results obtained are entirely unexpected since neither component alone will produce results even closely approaching that of the combined components.

In accordance with my invention, the activated alumina may be prepared by precipitating the tri-hydrate from an aluminate solution and calcining the precipitate at temperatures of from 300°–800° C. The methods of preparation are fully set forth in the patents to Barnitt No. 1,868,869 and Derr No. 2,015,593. A well known activated alumina is that sold by the Aluminum Ore Company under the trade-name "Alorco" (grade A). The alumina gel sold under this trade-mark has a large surface which makes it particularly active when used in conjunction with mild dehydrogenating catalysts.

The vanadium compounds which I prefer to use in combination with the gel are oxygen compounds of vanadium.

The catalyst in accordance with my invention is preferably prepared by mixing salt solutions of vanadium compounds with the activated alumina and heating the mixture with frequent stirring until almost dry and then completing the drying slightly above the boiling point of water. The dried catalyst is then decomposed by contacting it with air at a high temperature in order to convert the metallic compound into oxide. The catalyst is finally heated with hydrogen or other reducing gas at elevated temperature for a prolonged period of time and is then ready for use.

Gases such as ethane, propane and butane or mixtures thereof may be dehydrogenated by subjecting the gas to contact with the catalyst at temperatures ranging from 350°–750° C. With the higher boiling hydrocarbons such as butane the temperature required for dehydrogenation is lower than the temperature required for dehydrogenation of propane or ethane and similarly the temperature of dehydrogenation of propane is intermediate between that of butane and ethane. If it is desired to dehydrogenate a mixture of the gases, the optimum temperature will depend upon the relative proportions of the several constituents in the mixture, but in any case will lie somewhere between the optimum temperatures for the individual constituents.

The dehydrogenation may be carried out in conventional apparatus at pressures atmospheric, subatmospheric or super-atmospheric. The gas is preferably preheated to the conversion temperature prior to charging it to the reactor containing the catalyst. The reactor is preferably heated to maintain it at all times at conversion temperature. The gas is preferably dried prior to contacting it with the catalyst since the presence of water vapor or steam materially affects the efficiency of the catalyst, causing a lower amount of conversion to take place.

In order to more clearly understand the manner in which the catalyst is prepared, the following example is given:

Example 1

Ammonium meta vanadate (23 grams) was mixed with 225 grams of water and 100 c. c. of concentrated nitric acid and was then added to 400 grams of activated alumina which had been heated to 130° C. in an oven for 30 minutes and the mixture partly dried with stirring over an open flame. The drying was continued at 130° C. in an oven. The dried material was decomposed at 450° C. in air for 5 hours and then screened. The particles between 8 and 14 mesh were separated and reduced for 15 hours in dry hydrogen at 450° C., after which the catalyst was ready for use in the dehydrogenation of hydrocarbons.

It is to be understood that the foregoing example is given by way of illustration and that the amounts of materials and the temperature at which the several steps is carried out may be varied within wide limits.

The following examples are actual results obtained in using catalyst prepared in accordance with my invention:

Example 2

A gas consisting mainly of normal butane was contacted with a catalyst consisting of ammonium meta vanadate deposited on activated alumina and prepared in accordance with Example 1 at a temperature of 525° C. and at a space velocity of 505. The gas was dried prior to contact with the catalyst by passing it through activated alumina. The reaction gases were analyzed and showed an olefin content of 11.3% and a hydrogen content of 10.7%. The volume yield of olefins based on charging gas was 12.6%.

Example 3

Another run was made using the same gas and the same catalyst. At a temperature of 516°–520° C. and a space velocity of 508, the reaction gases contained 13% olefins and 13.8% hydrogen. The yield of olefin per cubic foot of charging gas was 15%. The run was continued for 25 hours. After this period of time the activity began to drop. Carbon was burned off of the catalyst and the run continued. After the regeneration of the catalyst a temperature of 551°–564° C. and a space velocity of 694 was employed. The olefin content of the reaction gases exceeded 20% for 7 hours. After 19 hours of use the activity of the catalyst was such that there was still 13% of olefins in the reaction gases based on the volume of the charging gas.

Example 4

In a similar run the same gas and the same catalyst were used at a temperature of 516°–520° C. and a space velocity of 508. A Podbielniak analysis of the reaction gases showed 12.6% hydrogen, 12.1% olefins and 75.3% butanes.

In the examples given above, space velocity is defined as volume of gas at 0° C. and 760 millimeters pressure entering converter per hour, per unit volume of catalyst. The runs were all conducted at substantially atmospheric pressure.

The invention is not limited to dehydrogenation of gases at the space velocities given in the specific examples but the space velocities may be varied over a wide range of approximately 150 to 10,000, depending upon the gas treated and the temperature of treatment. Generally speaking, high space velocities may be used with the higher boiling gases and with high temperatures, while the lower space velocities will be preferable with low boiling gases and with lower temperature ranges. With gas mixtures, the space velocities will preferably be intermediate between the upper and lower limits.

As has previously been said, the catalysts prepared in accordance with my invention retain their activity for longer periods of time than catalysts which have hitherto been tried. Various specified details of procedure and conditions of operation have been set forth above for the purpose of giving a clear understanding of the process, but the intention is not limited to the exact details given as it includes modifications and changes coming within the scope of the appended claims.

The structure of the metal or oxide deposited on the alumina is immaterial. No effort is made to deposit the metal or oxide in any particular form so long as it is evenly distributed over the alumina support. The catalyst can be easily reactivated after the activity has fallen off by carefully heating in air until no more carbon dioxide is obtained, indicating the complete combustion of carbon.

What I claim is:

1. Method of dehydrogenating paraffinic hydrocarbon gases which comprises contacting said gases at reacting temperatures with a catlyst comprising "activated alumina" made by precipitating the trihydrate of alumina from an aluminate solution and calcining the precipitate at temperature between 300 and 800° C. and a vanadium-oxygen compound.

2. The method of converting normally gaseous paraffinic hydrocarbons into olefinic hydrocarbons which comprises contacting the paraffinic hydrocarbons at reacting temperature and at suitable space velocity with a catalyst prepared by impregnating "activated alumina" made by precipitating the trihydrate of alumina from an aluminate solution and calcining the precipitate at temperature between 300 and 800° C., with a solution of a vanadium compound, drying the impregnated "activated alumina", decomposing it by means of air at elevated temperatures, and subjecting the decomposed material to the reducing action of hydrogen at elevated temperatures.

3. Method of dehydrogenating normally gaseous hydrocarbons which comprises contacting said hydrocarbons at elevated temperatures with a catalyst comprising "activated alumina" made by precipitating the trihydrate of alumina from an aluminate solution and calcining the precipitate at temperature between 300 and 800° C., on which has been deposited a vanadium-oxygen compound.

4. Method in accordance with claim 2 where the reacting temperature is 350°–750° C.

5. Method in accordance with claim 2 where the reacting temperature is 350°–750° C. and the space velocity is 150 to 10,000.

6. Method of dehydrogenating low boiling paraffinic hydrocarbons which comprises contacting said hydrocarbons at reacting temperatures with catalyst comprising "activated alumina" made by precipitating the trihydrate of alumina from an aluminate solution and calcining the precipitate at temperature between 300 and 800° C., and a vanadium-oxygen compound.

CARLISLE M. THACKER.